United States Patent [19]

Timan

[11] Patent Number: 5,052,707
[45] Date of Patent: Oct. 1, 1991

[54] TORQUE LINKAGE BISECTOR CENTRING MECHANISM

[75] Inventor: Peter E. Timan, Sydenham, Canada

[73] Assignee: UTDC Inc., Kingston, Canada

[21] Appl. No.: 589,917

[22] Filed: Sep. 26, 1990

[30] Foreign Application Priority Data

Sep. 29, 1989 [CA] Canada .................................. 614935

[51] Int. Cl.$^5$ .............................................. B60D 5/00
[52] U.S. Cl. .................................. 280/403; 280/461.1; 105/3; 105/8.1
[58] Field of Search ............ 280/403, 419, 424, 461.1, 280/484, 494; 105/3, 8.1

[56] References Cited

U.S. PATENT DOCUMENTS

| | | | |
|---|---|---|---|
| 2,843,417 | 7/1958 | Wahl et al. ....................... | 280/403 X |
| 3,884,155 | 5/1975 | Maroshick ........................... | 105/3 X |
| 4,247,128 | 1/1981 | Knapp et al. ....................... | 280/403 |
| 4,455,033 | 6/1984 | Becker et al. ...................... | 280/403 |
| 4,458,911 | 6/1984 | Chadwick et al. .......... | 280/461.1 X |
| 4,482,165 | 11/1984 | Dawson et al. ................. | 280/403 X |
| 4,503,779 | 3/1985 | Chadwick ....................... | 280/403 X |
| 4,781,123 | 11/1988 | Yoshihara ........................... | 105/3 X |

FOREIGN PATENT DOCUMENTS

2212613  3/1972  Fed. Rep. of Germany ...... 280/403

Primary Examiner—Charles A. Marmor
Assistant Examiner—Kevin Hurley
Attorney, Agent, or Firm—Fleit, Jacobson, Cohn, Price, Holman & Stern

[57] ABSTRACT

A centering mechanism for a tunnel of an articulated vehicle includes a pair of control members connected to opposite ends of a transversely extending arm. The members extend to transverse links that connect spaced portions of the adjacent vehicle bodies and act as a torque transmitting linkage through a cross-over link pivoted on one of the vehicle bodies. The members are connected at the midpoints of the transverse links so that they are displaced one-half the relative displacement of the vehicle bodies as they negotiate vertical curves and thereby maintain the tunnel centered.

4 Claims, 7 Drawing Sheets

TORQUE LINKAGE BISECTOR CENTRING MECHANISM

The present invention relates to articulated vehicles and in particular passenger carrying articulated vehicles such as street cars.

It is well known to articulate vehicles to enable them to negotiate a smaller radius curve than is available with a rigid chassis vehicle of comparative length. Conventionally such vehicles are articulated at the midpoint of the vehicle so that the front and rear wheels of the vehicle follow the same curve.

In these passenger carrying vehicles, it is generally desirable to have the two portions of the vehicle interconnected in a manner that allows movement of the passengers from one portion to another. This avoids the need for duplicate crew and entrance and exit doors. The interconnection is usually achieved by means of a tunnel structure arranged at the articulation point to provide the required passageway. Such a tunnel structure must be designed to accomodate movement between the two vehicle portions while still providing an adequate passageway between the vehicles. The vehicle must be able to accomodate horizontal curves, that is steering movement about a vertical axis and vertical curves, that is a change of elevation of the track being negotiated. There is also a tendency for the two halves of the chassis to oscillate about the longitudinal axis relative to one another due to an unevenness in the track or the spiralling of the track that is usually found at the start of a curve in a tracked vehicle. Such oscillation tends to cause lateral displacement between the two passenger carrying portions of the vehicle and this is generally undesirable where a passageway is used to connect the two vehicles. Such displacement is usually prevented by means of the bearing assembly which connects the two cars and permits the articulation between the cars. The forces which tend to produce the lateral displacement are reacted at this bearing to rigidly connect the cars about the longitudinal axis. However, this requires the bearing structure to be relatively large and heavy in view of the magnitude of the forces imposed. Further, this bearing structure is necessarily accomodated beneath the tunnel structure where space is at a premium.

A solution to this problem is proposed in U.S. Pat. No. 4,455,033 to Becker et al and assigned to the assignee of the present application. In this arrangement, a torque transmitting linkage is disposed above the tunnel structure to oppose lateral displacement between the vehicles. This arrangement has proven successful in revenue service.

A further need to be addressed with such articulated vehicles is the necessity to keep the tunnel centred so that it bisects the angle between the vehicle portions as the vehicle negotiates a vertical curve. By controlling movement of the tunnel, the panels forming the tunnel structure do not have to accomodate excessive movement.

In U.S. Pat. No. 4,458,911 to Chadwick and assigned to the assignees of the present application, a mechanism is disclosed that serves to control movement of the tunnel structure by the interaction of two sets of intermeshing gears. This device has also proven satisfactory in revenue service although it requires a complex mechanism separate to the torque transmitting linkage which is costly and difficult to adjust.

U.S. Pat. No. 3,884,155 to Maroshick discloses a mechanism that acts to centre the tunnel structure of an articulated vehicle. However, the linkage disclosed introduces significant loads into the tunnel structure and operates "off centre" when negotiating compound curves to introduce further loads into the tunnel.

It is therefore an object of the present invention to provide an articulated vehicle in which the above disadvantages are obviated or mitigated.

According to the present invention, there is provided an articulated vehicle comprising a first chassis and a second chassis, each having an outboard end and an inboard end, and each supporting a vehicle superstructure, coupling means interconnecting said inboard ends of said chassis and including vertical pivot means to accomodate relative movement of said chassis about a vertical axis for steering movement of said vehicle and horizontal pivot means to accomodate relative pivotal movement of said chassis about a transverse horizontal axis for relative vertical movement between said outboard ends, said coupling means further comprising torque transmitting means vertically spaced from said horizontal pivot means and operable to inhibit lateral movement between said chassis, said torque transmitting means including a first link pivotally connected to one of said chassis for movement about a vertical axis and a pair of transverse links extending between said one link and said other chassis and being connected thereto by vertical pivot connections to permit movement of said transverse links in a generally horizontal plane, said transverse links being connected to said first link at spaced locations whereby pivotal movement of said first link upon relative lateral displacement of said chassis is inhibited, a tunnel structure extending between adjacent ends of said superstructures to provide interconnection therebetween, said tunnel structure being pivotally supported for movement about a transverse horizontal axis adjacent said horizontal pivot means, and having a centring mechanism operable on said tunnel structure to maintain the tunnel structure in a disposition to bisect the angle between the chassis, said centering mechanism including a transverse arm pivotally connected to said tunnel structure for rotation about a vertical axis, and a pair of control members extending from opposite ends of said arm at locations equidistant from said pivot axis to the midpoints of respective ones of said transverse links and connected thereto by pivotal connections to permit rotation about a vertical axis whereby displacement of said transverse links induced by rotation of said chassis about said transverse horizontal axis produces a proportional displacement of said arm to maintain said tunnel structure centrally disposed between said superstructures.

An embodiment to the invention will now be described by way of example only with reference to the accompanying drawings in which:

FIG. 4 is a schematic plan view showing the linkage of FIG. 3 in different operating positions of the street cars with FIG. 4a showing the linkage with the cars in a straight horizontal position, FIG. 4b showing the street cars negotiating a horizontal curve and FIG. 4c showing the street cars negotiating a vertical curve.

Figure 1:
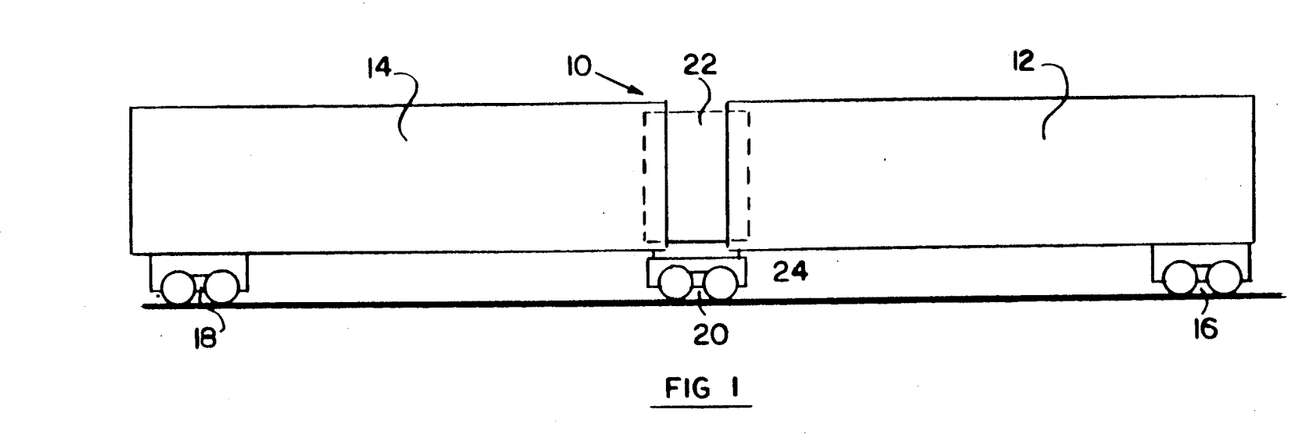
FIG. 1 is a general side view of an articulated street car.

Referring now to the drawings and in particular FIG. 1, an articulated vehicle, in this case a street car, generally designated 10 comprises a leading car 12 and a trailing car 14. The cars 12 and 14 are supported on leading and trailing bogies 16, 18 respectively and by an intermediate bogie 20 positioned between the two cars. The intermediate bogie 20 also supports a tunnel structure generally designated 22 which interconnects the interiors of the two cars 12, 14 to allow movement of passengers between the cars. The cars 12 and 14 are connected to a turntable 24 to accomodate relative movement about a vertical axis, designated VV on FIG. 2, to provide steering movement and about a horizontal axis designated H in FIG. 6 to accomodate changes in elevation.

Figure 2:
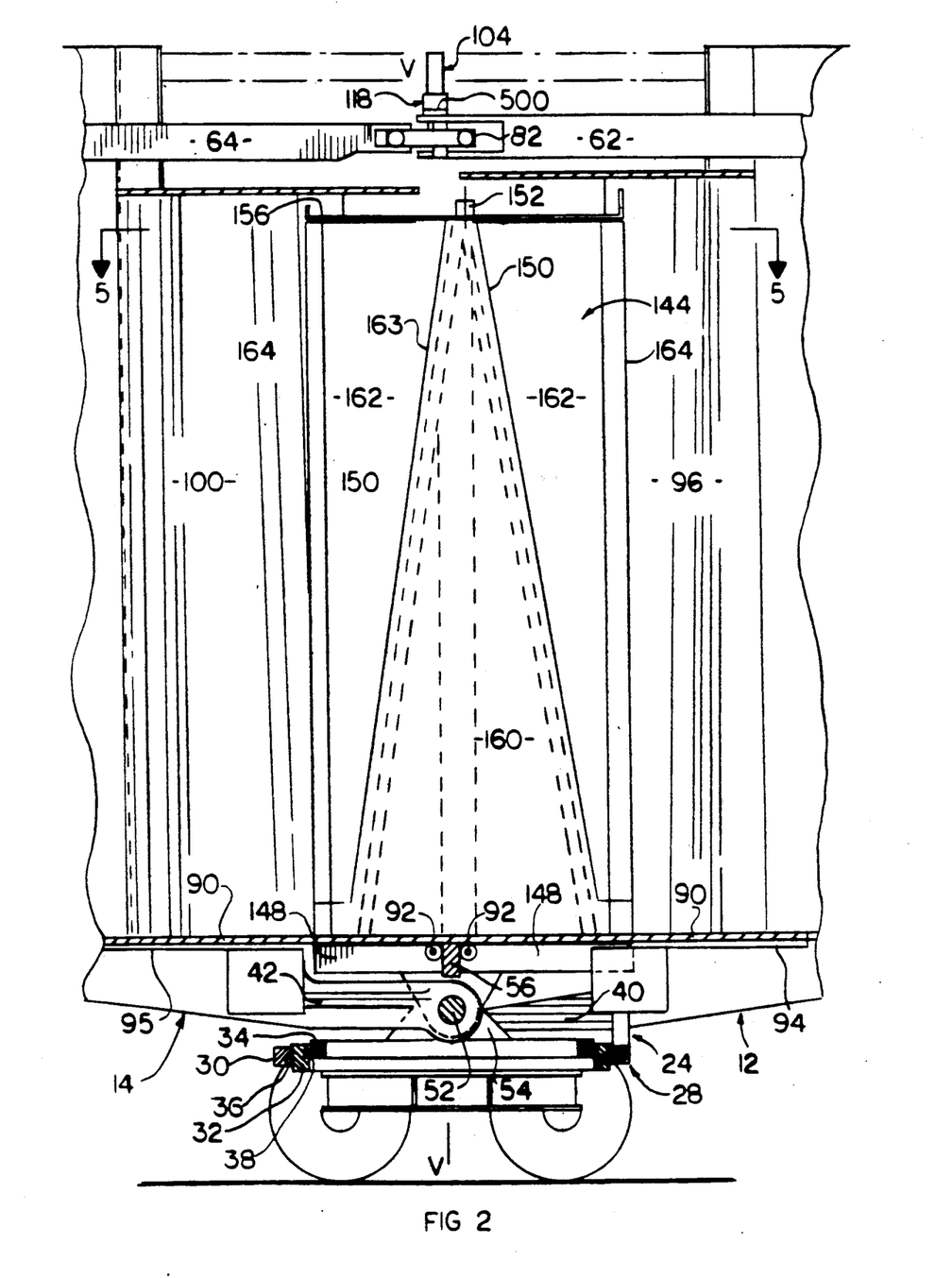
FIG. 2 is a sectional elevation of the central portion of the street car shown in FIG. 1.
Figure 5:
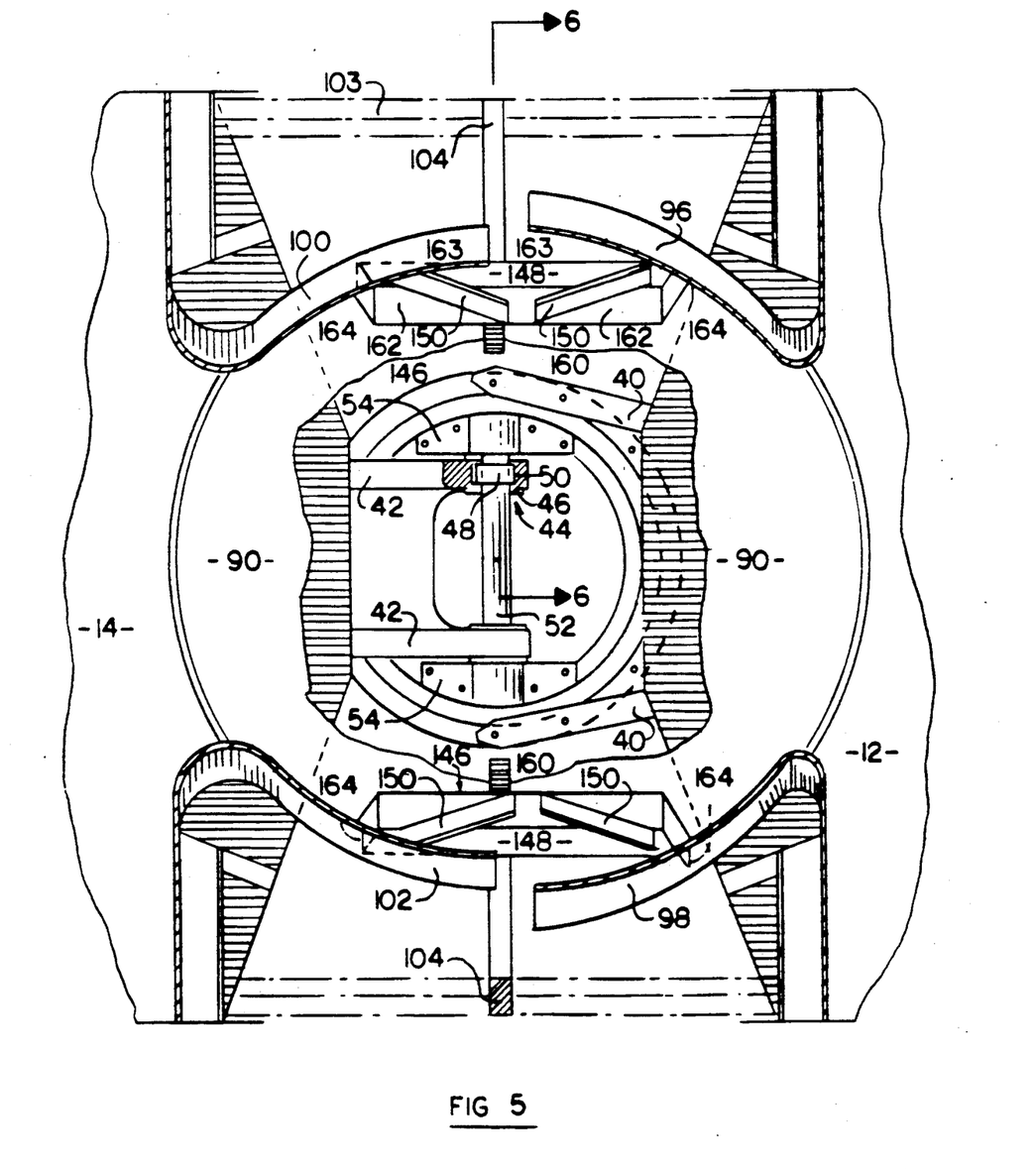
FIG. 5 is a section on the line 5—5 of FIG. 2.

The details of the turntable 24 and the connection of the cars 12, 14 thereto can best be seen in FIGS. 2 and 5. The turntable 24 comprises of transverse bolster 26 to which are rotatably mounted the wheel sets of the bogie 20. A bearing assembly 28 is also mounted on the bolster 26 and comprises an outer ring 30, intermediate ring 32 and an inner ring 34. A pair of races 36, 38 connect the outer and intermediate and the inner and intermediate rings respectively. The rings 30, 32 and 34 may therefore rotate relative to one another about a generally vertical axis.

The intermediate ring 32 is connected to the transverse bolster 26. The leading car 12 is provided with a pair of support beams 40 which project rearwardly from the car below the general level of the passenger carrying compartment and are bolted to the outer ring 30. The trailing car 14 also includes a pair of support beams 42 which project forwardly from the car in spaced parallel relationship. The ends of the support beams 42 are bored to receive self-aligning bearing assemblies 44 which comprise an outer race 46 and an inner race 48. Each of the races has a spherical bearing surface so that the inner race can adopt a wide range of positions relative to the outer race. The inner race 48 is bored as indicated at 50 to receive a transverse shaft 52. The ends of the shaft 52 are supported in upstanding ears 54 which are bolted to the inner ring 34 of the bearing assembly 28. The two cars 12, 14 may therefore rotate relative to one another about a generally vertical axis which will result in relative movement between the inner and outer rings. At the same time, the self-aligning bearing assemblies 44 permit the trailing car 14 to rotate about a generally horizontal axis relative to the leading car and intermediate bogie to accomodate vertical curves.

The cars 12, 14 are also connected at roof level by means of a torque resisting linkage generally designated 60. As can best be seen in FIG. 3, the leading car 12 includes a longitudinal beam 62 which projects rearwardly from the roof of the car 12 on the centre line of the car. The trailing car 14 also includes a pair of longitudinal beams 64, 66 which are spaced to opposite sides of the centre line of the car 14. The longitudinal beam 62 is pivotally connected to a cross-over link 68 by a pin 70 positioned midway along the link 68. One end 72 of the link 68 is pivotally connected by a connection 74 to a first transverse link 76. The link 76 is connected by a connection 78 to the beam 64. Similarly, the other end 80 of the link 68 is connected by connection 84 to a second transverse link 82 which in turn is connected by a connection 86 to the beam 66. The first and second transverse links 76, 82 lie generally parallel to one another and the connections 74, 78, 84 and 86 are all arranged to permit pivoting movement about a generally vertical axis. The pin 70 is coincident with the vertical axis V of the turntable.

Figure 4A:
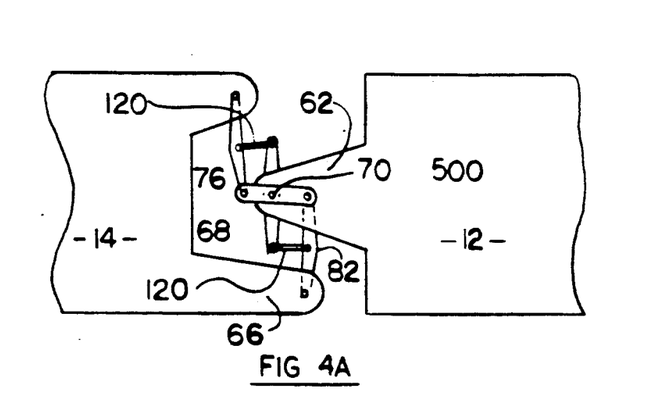
Figure 4B:
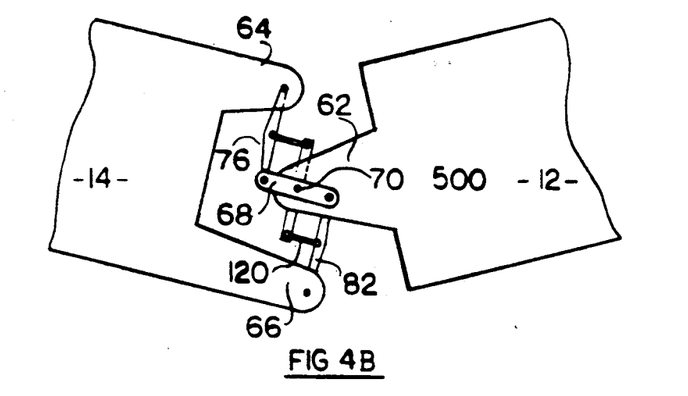
Figure 4C:
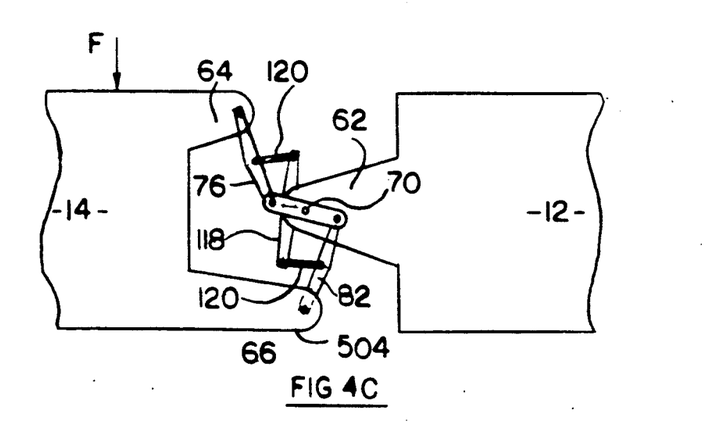

Upon the cars 12, 14 negotiating a horizontal curve, the cross-over link 68 will rotate about the pin 70 to permit displacement of the cars 12, 14 about the vertical axis V. The orientation of the cross-over link 68 with the transverse links 76, 82 remains constant so that a simple pivoting movement is achieved about the pin 70. This arrangement can best be seen in FIG. 4b in which the cars 12, 14 are negotiating a left-hand curve. Upon the cars entering a vertical convex curve, the leading car will drop relative to the trailing car. This movement is accomodated about the transverse shaft 52 and causes a displacement in the position of the pin 70 relative to the rear car 14. This displacement is accomodated by pivotal movement of the transverse links relative to the support beams 64, 66 and by rotation of the cross-over link 68 about the pin 70. Because the transverse links 76, 82 are substantially parallel and of equal length, the displacement of the connection 74 and 84 to either side of the centre lines of the vehicle is equal and opposite which is accomodated by rotation of the link 68 about the pin 70. This arrangement is shown in FIG. 4c in which it will be seen that the cross-over link 68 is rotated in a clockwise direction about the pin 70 to allow the car 12 to rotate about the horizontal axis H relative to the trailing car 14. Thus the torque resistant linkage 60 does not inhibit the articulation of the cars about the horizontal and vertical axis.

Upon a force to cause lateral displacement between the cars 12, 14, due for example to an uneven track or to the banking of the track, the torque resistant linkage 60 operates to prevent relative displacement between the cars. The forces causing lateral displacement diagrammatically indicated by arrow F in FIG. 4c acts to move the longitudinal beam 62 toward one of the beams 64, 66. This would cause the pin 70 to move toward the beam, for example 66, so that the second transverse link 82 would tend to induce rotation of the cross-over link 68 about the pin 70 in an anti-clockwise direction. However, such rotation is resisted by the first transverse link 76 acting on the opposite side of the pin 70 so that the forces tending to displace the cars 12, 14 laterally are resisted by the linkage 60. Such forces are also resisted by transverse shaft 52 operating through the bearing assembly 28 so that the cars remain aligned on the center line of the vehicle. The provision of the roof mounted torque resisting linkage 60 enables the bearing assembly 28 to be designed to accomodate much smaller forces that would otherwise be the case.

Figure 6:
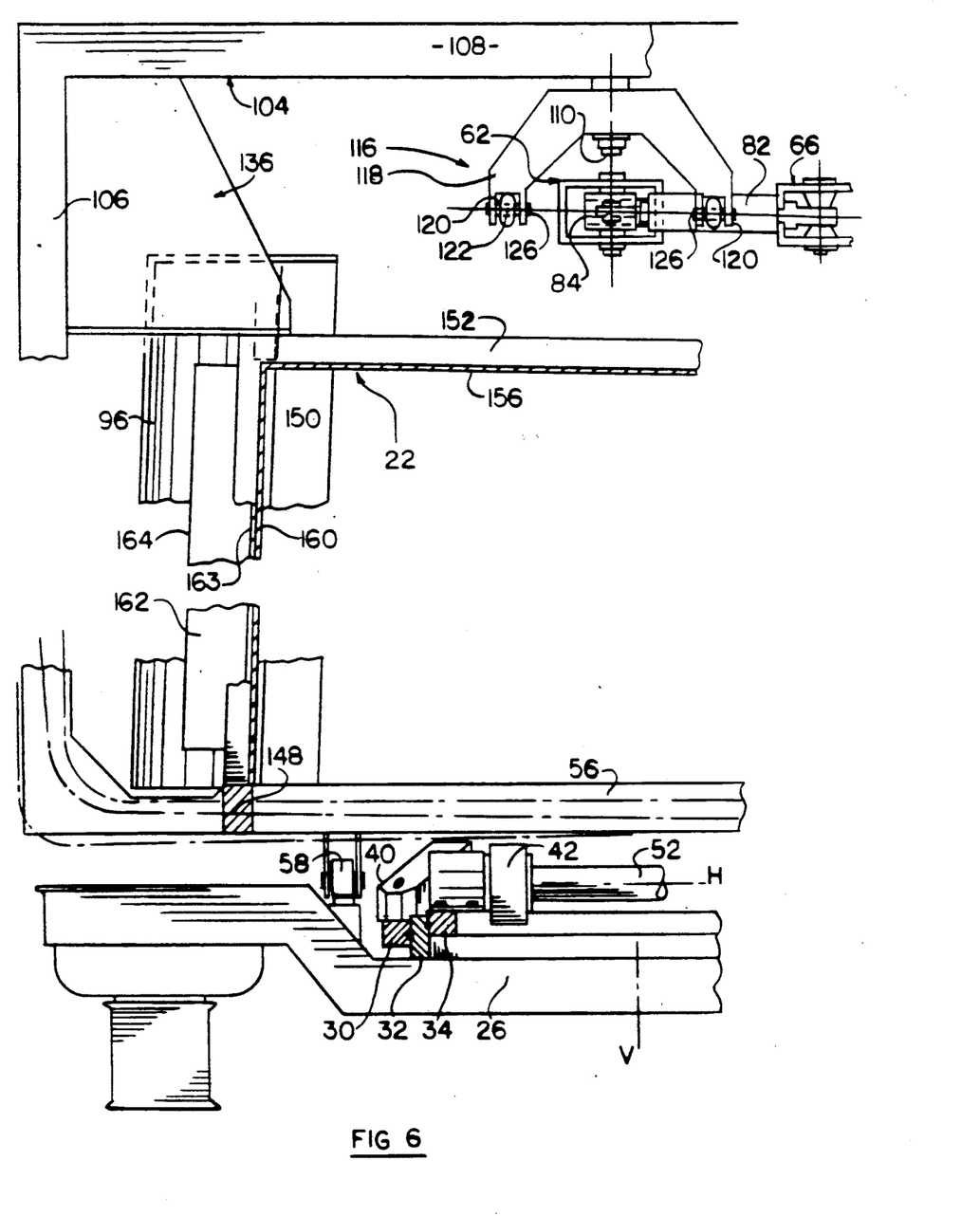
FIG. 6 is a section on the line 6—6 of FIG. 2

The tunnel structure 22 is supported on a transverse beam 56 which is connected by pins 58 to the outer ends of the bolster 26 as seen in FIG. 6. The pins 58 permit the beam to rotate about generally horizontal transverse axis to permit the tunnel structure to move back and forth along the longitudinal axis of the vehicle. The beam 56 also carries a pair of semi-circular floor plates 90 which are connected to the beam 56 by hinges 92 (FIG. 2). The periphery of the floor place rests on semi-circular recesses 94, 95 provided in the ends of the leading and trailing cars 12, 14 respectively. Upon rotation of the cars about the vertical axis, sliding movement between the floor plate 90 and the respective recess 94, 95 occurs and upon movement about the horizontal axis H, pivotal movement of the plates about the hinge 92 will occur. The periphery of the floor plates 90 is also covered by four part cylindrical shells, 96, 98, 100, 102 which are connected in respective pairs to the leading and trailing cars 12, 14. The shells 96 to 102 define the entrance to the passageway between the cars and provide a smooth transition from the interior of the vehicle to the tunnel structure 22. It will be observed from FIG. 5 that the shells 96, 98 connected to the leading car 12 are of greater diameter than the shells 100, 102 connected to the trailing car 14. The shells are also inclined slightly to the vertical axis to provide a generally conical structure. The differing diameter of the shells permits them to overlap one another as the cars negotiate a horizontal curve.

The exterior of the cylindrical shells 96 to 102 is protected by a bellows 103 connected at opposite ends to the cars 12, 14 and supported intermediate the cars by a hoop 104. The hoop 104 is connected to the ends of the transverse beam 56 and includes a pair of vertical posts 106 and a horizontal beam 108. A pin 110 is secured to the beam 108 at the vehicle centreline and projects downwardly from it to support a centring mechanism 116. A centering mechanism 116 is pivoted on the pin 110 to the cross-beam 108 for movement about a vertical axis.

Figure 3:
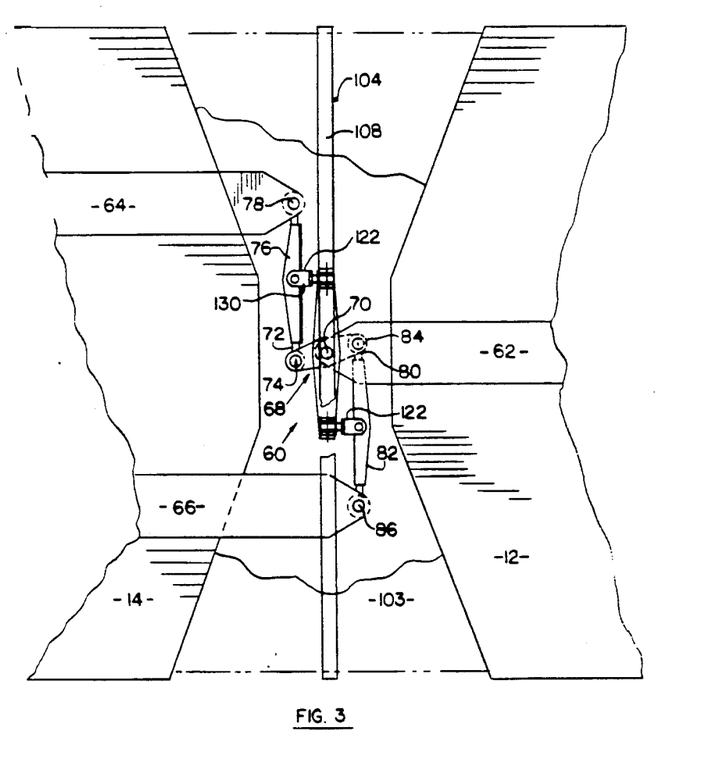
FIG. 3 is a plan view of FIG. 2, with portions thereof broken away for clarity of description
Figure 7:
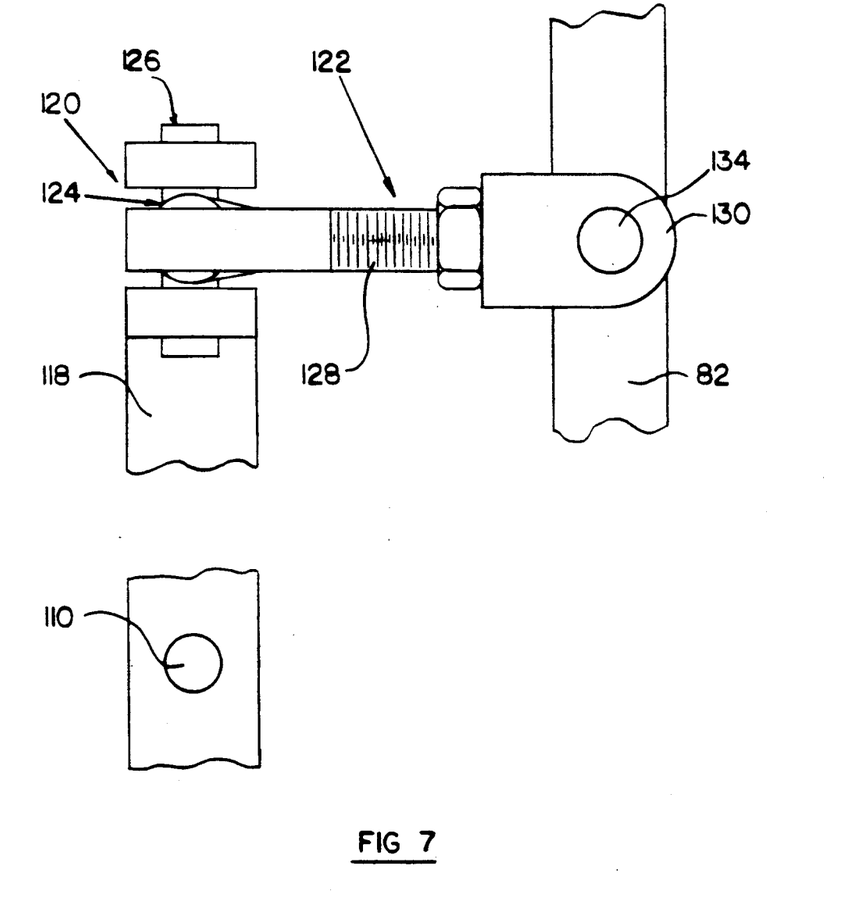
FIG. 7 is an enlarged view of a portion of the mechanism shown in FIG. 3.

The centering mechanism 116 is best seen in FIGS. 3, 6 and 7 and comprises an arm 118 pivoted at its midpoint on the pin 110 with opposite ends of the arm 118 having forks 120. The arm 118 extends transverse generally parallel to the beam 108 with the bifurcations 120 being generally in the same plane as the beams 62, 64, 66. Control members 122 extend from each of the bifurcations 120 to the midpoint of the transverse links 76, 82. Control members 122 include a spherical joint 124 at one end of a threaded shaft 128 and pivotally connected within the bifurcation 120 by a pin 126. A clevis 130 is secured on the shaft 128 and secured in position by means of locknut 132. A pin 134 extends through the clevis 130 and the respective one of the transverse links 76,82 to permit rotation of the clevis 130 about a generally vertical axis.

Upon the vehicle negotiating a vertical curve, as shown in FIG. 4c, a relative longitudinal displacement between the beam 62 and beams 64,66 occurs, causing the transverse links 76,82 to be displaced as previously described. The midpoint of each of the transverse links 76,82 is displaced only half the longitudinal distance of the displacement between the beams 62 and 64,66 so that the clevises 130 of control links 122 are similarly displaced longitudinally an amount equal to half the displacement between adjacent vehicle bodies of opposite ends. The arm 118 is likewise displaced an equal amount and acts through pin 110 to maintain the beam 108 central between the two bodies.

The beam 108 is itself connected through a fillet plate 136 to the tunnel structure 22 with movement of the beam 108 being accomodated by rotation about the horizontal axis H. Thus the tunnel structure itself is maintained centrally between the two vehicle bodies as vertical curves are negotiated.

Horizontal curves will be accomodated by rotation of the arm 118 about the pin 110 and lateral displacement between the two car bodies is countered by the torque transmitting linkage without inducing loads in the arm and tunnel structure.

A tunnel liner 144 is supported on the transverse beam 56 and by the hoop 104 to seal the area between the part cylindrical shells 96 to 102. The tunnel line 144 includes a pair of side panels 146 which are connected to a pair of outriggers 148 mounted at opposite ends of the transverse beam 56. The side panels 146 are also supported by vertical posts 150 which converge to meet a horizontal roof truss 152 and are connected to plate 130. The side panels 146 are connected to a roof panel 156 which is also supported by the roof truss 152. The tunnel liner 144 therefore moves with the hoop 104 under the influence of the centering mechanism 116.

It will be noted that the tunnel structure 144 is displaced toward the leading car 12. This is to compensate for the different diameter of the shells 96, 98 and 100, 102 to equalize the spacing between side panels 146 and the adjacent shell.

It will be appreciated that as the street car 10 negotiates vertical curves, the side panels 146 and the cylindrical shells 96-102 will move relative to one another about the horizontal axis H. Under normal circumstances, such movement would cause the clearance between the panel 146 and the adjacent shell to vary along the height of the panel 146 due to the inclined line of contact of the panel 146 with the cylindrical surface of the shell. This has created a safety problem in that sufficient clearance must be left between the panels and the shells to allow for the maximum clearance which also results in a gap being left between the panels and the side walls to present a safety hazard. To overcome this problem, the side panels 146 are formed from a stationary portion 160 fixed to the outriggers 148 and to the roof panel 156. The stationary portion 160 is of a generally triangular shape with the base of a triangle supported by the outriggers 148 and with the apex adjacent the roof truss 152. A pair of triangular fillet panels 162 hinged along the inclined edge 163 of the stationary portion so as to be pivotable about an axis running parallel to the inclined edge 163 of the stationary portion. The outer edges 164 of the fillet panels are jogged so as to lie at an acute angle with respect to the remainder of the side panels 146. The outer edges 164 are biased against the cylindrical shells 96 to 102 so as to follow the shells during relative movement between the cars 12, 14.

Upon the car negotiating a horizontal curve, the cylindrical shells slide within one another at each side and the line of contact between the shells and the outer edges of the fillet panels 162 remains substantially vertical. However, upon the vehicle negotiating a convex vertical curve, the two cards rotate about the horizontal axis H which causes the upper edges of the cylindrical shells 96 to 102 to move away from each other. The movement of the upper edge of the shells is greater than that of the lower edge and due to the cylindrical nature of the shells 96 to 102, the distance between the tope edge of the side panel 146 and its respective liner and the lower edge of the side panel 146 and its respective liner will be greater than the distance of the bottom edge of the side panel and the liner. However, by hinging the fillet panels 162 along an inclined edge, for a given angular displacement of the fillet panel relative to the stationary portion 160, the upper edge of the fillet panel will move a greater distance laterally than the lower edge. This therefore compensates for the variation in lateral spacing and enables the fillet panels to closely follow the walls of the shells and maintain an effective seal at all times. It has been found that by adopting the inclined hinged panels, the gap between the panels and the cylindrical shells can be effectively sealed at all times and therefore reduce the risk of entrapment of part of one of the passengers during movement of the

We claim:

1. An articulated vehicle comprising a first chassis and a second chassis, each having an outboard end and in inboard end, and each supporting a vehicle superstructure, coupling means interconnecting said inboard ends of said chassis and including vertical pivot means to accomodate relative movement of said chassis about a vertical axis for steering movement of said vehicle and horizontal pivot to accomodate relative pivotal movement of said chassis about a transverse horizontal axis for relative vertical movement between said outboard ends, said coupling means further comprising torque transmitting means vertically spaced from said horizontal pivot means and operable to inhibit lateral movement between said chassis, said torque transmitting means including a first link pivotally connected to one of said chassis for movement about a vertical axis and a pair of transverse links extending between said one link and said other chassis and being connected thereto by vertical pivot connections to permit movement of said transverse links in a generally horizontal plane, said transverse links being connected to said first link at spaced locations whereby pivotal movement of said first link upon relative lateral displacement of said chassis is inhibited, a tunnel structure extending between adjacent ends of said superstructures to provide interconnection therebetween, said tunnel structure being pivotally supported for movement about a transverse horizontal axis adjacent said horizontal pivot means, and having a centring mechanism operable on said tunnel structure to maintain the tunnel structure in a disposition to bisect the angle between the chassis, said centering mechanism including a transverse arm pivotally connected to said tunnel structure for rotation about a vertical axis, and a pair of control members extending from opposite ends of said transverse arm at locations equidistant from said pivot axis to the midpoints of respective ones of said transverse links and connected thereto by pivotal connections to permit rotation about a vertical axis whereby displacement of said transverse links induced by rotation of said chassis about said transverse horizontal axis produces a proportional displacement of said arm to maintain said tunnel structure centrally disposed between said superstructures.

2. An articulated vehicle according to claim 1 wherein said control members are adjustable.

3. An articulated vehicle according to claim 1 wherein said control members are disposed in the same horizontal plane as said transverse links.

4. An articulated vehicle according to claim 3 wherein said transverse arm is pivotally connected to a hoop supporting a flexible bellows structure extending between said vehicles and encompassing said tunnel structure, said hoop being connected to said tunnel structure for movement therewith and said torque transmitting linkage being located between said hoop and said tunnel structure.

* * * * *